FM MULTIPLEX STEREO TRANSMISSION INDICATING APPARATUS

Filed May 17, 1963

Jiro Kasuga,
INVENTOR.

BY Wenderoth,
Lind and Ponack, Attorneys

United States Patent Office 3,246,083

Patented Apr. 12, 1966

3,246,083

FM MULTIPLEX STEREO TRANSMISSION INDICATING APPARATUS

Jiro Kasuga, Tokyo, Japan, assignor to Torio Company, Limited, Tokyo, Japan, a limited-liability company of Japan Filed May 17, 1963, Ser. No. 281,269
1 Claim. (Cl. 179—15)

The present invention relates to FM multiplex stereo transmission indicating apparatus, which is to be used in FM receivers for such transmissions.

An FM multiplex stereo transmission indicating apparatus according to the invention comprises a low pass filter for extracting the main FM carrier for the audio frequency, a sideband filter for extracting an AM double sideband suppressed carrier part of a superaudio frequency, a synchronous and doubling circuit for extracting a pilot signal and producing a sub-carrier of doubled frequency, an indicator switch which is installed between said low pass filter and the connection point of two series resistors of a matrix, and two parallel detectors of different polarity, through which the connection point of the sideband filter and the synchronous doubling circuit is connected to two parallel resistors, respectively, of said matrix.

In FM multiplex stereo transmission receivers provided with said indicating apparatus, when an FM multiplex stereo transmission such as of the GE-Zenith system is received and said indicating switch is opened, loud speakers in the receiver make a sound due to an AM $L-R$ signal, whereby said FM multiplex stereo transmission can be readily noticed.

The more specific objects and advantages will become apparent from a consideration of the following description.

Figure 1:
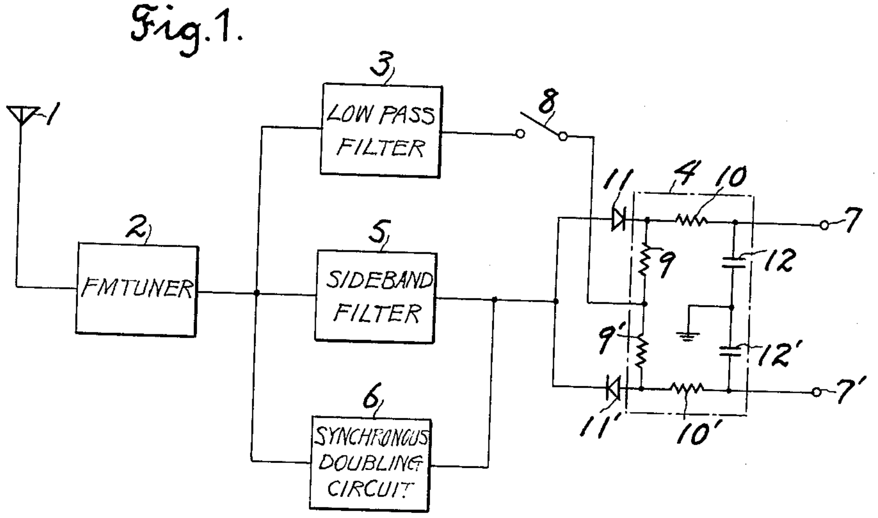
Figure 2:
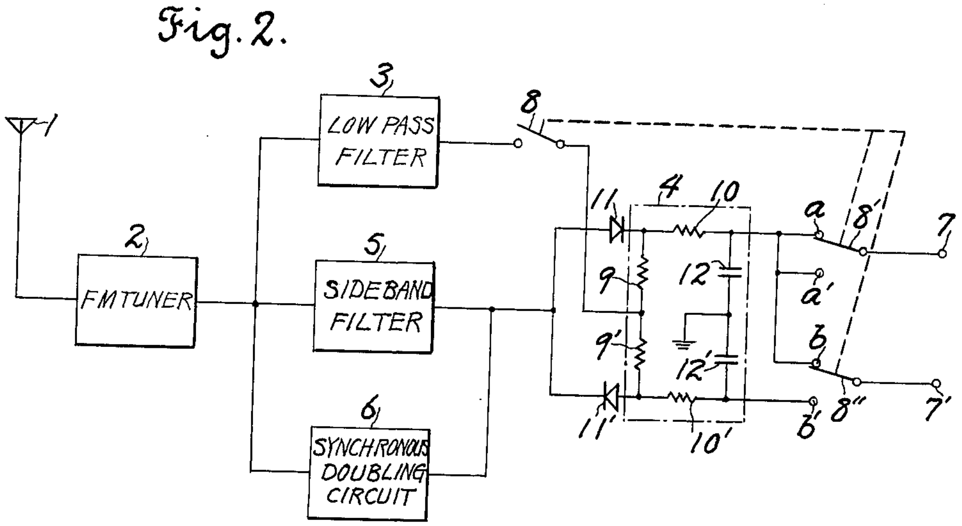

In the accompanying drawing:

FIG. 1 is a block and connection diagram of the main part of an FM multiplex stereo transmission receiver provided with an indicating apparatus according to the invention; and FIG. 2 is a similar view of the above provided with another embodiment of the invention.

Like reference characters show corresponding parts throughout the views

As already known, in FM multiplex stereo transmission receivers, for example, of the GE-Zenith system, a composite stereo signal composed of three basic parts is received by an antenna 1, FIG. 1, and is selected by an FM tuner 2. After amplification, the main FM carrier of the audio frequency including the $L+R$ information, which is the first part of said composite stereo signal, is extracted by a low pass filter 3 and added to a matrix 4. On the other hand, an AM double sideband suppressed carrier part of a superaudio frequency including the $L-R$ information is extracted by a sideband filter 5, and a pilot signal is extracted and introduced to a synchronous and doubling circuit 6, resulting in a sub-carrier of doubled frequency, and said sub-carrier combines with said double sidebands, producing an AM $L-R$ envelope. Then, after detection, said envelope is added to the matrix 4, thus the left and right stereo signals are separately obtained by said matrix at its output terminals 7 and 7'.

According to the invention, an indicating switch 8 is installed between the low pass filter 3 and the connection point of series resistors 9 and 9' of the matrix 4, and the connection point of the sideband filter 5 and the synchronous doubling circuit 6 is connected to parallel resistors 10 and 10', the front ends of which are respectively connected to the outer ends of the series resistors 9 and 9', of the matrix 4 through detectors 11 and 11', respectively, which are of different polarity.

Inserted between the rear ends of the parallel resistors 10 and 10' are series condensers 12 and 12' for passing high frequency disturbances, the connection point of said series condensers being grounded.

When an FM multiplex stereo transmission such as that of the GE-Zenith system is caught by this receiver and the indicating switch 8 is opened, AM $L-R$ signals of audio frequency are obtained at the output terminals 7 and 7', and accordingly, a certain sound is produced by loud speakers mounted in said receiver, and the presence of said FM multiplex stereo transmission can be readily indicated. Then, by closing the switch 8, the required FM stereo transmission is reproduced by said speakers as a stereo sound. On the other hand, when an FM monaural transmission is caught by said receiver and said switch is opened, nothing is heard from the speakers.

However, according to this embodiment of the invention, the AM $L-R$ signals obtained at the terminals 7 and 7' are of opposite phase to each other, and a distorted sound similar to a noise is apt to be obtained, and consequently, said detection is not reliable.

Such defect is entirely removed by another embodiment of the invention as shown in FIG. 2, which is similar to the aforesaid embodiment except a switching device. Said switching device consists of an indicating switch 8 similar to the detecting switch in the aforesaid embodiment and two switches 8' and 8'' which are installed between the matrix 4 and the output terminals 7 and 7', respectively, and coupled to said indicating switch to be simultaneously moved therewith.

The switches 8' and 8'' have two contacts *a*, *a'* and *b*, *b'*, respectively, and the contacts *a*, *a'* and *b* are connected to the connection point of the resistor 10 and the condenser 12, and the contact *b'* is connected to the connection point of the resistor 10' and the condenser 12'.

When an FM multiplex stereo transmission is received and the indicating switch 8 is opened, the switches 8' and 8'' being connected to the contacts *a* and *b*, respectively, AM $L-R$ signals of the same phase are obtained at the output terminals 7 and 7', and a not unpleasant sound is produced by loud speakers mounted in this receiver. After said indication, when the indicating switch 8 is closed, the switches 8' and 8'' are connected to the contacts *a'* and *b'*, respectively, the required stereo sound is obtained by said speakers.

What I claim is:

An FM multiplex stereo transmission indicating apparatus comprising a low pass filter for extracting the main FM carrier of the audio frequency, a sideband filter for extracting an AM double sideband suppressed carrier part of a superaudio frequency, a synchronous and doubling circuit connected in parallel with said sideband filter for extracting a pilot signal and producing a sub-carrier of doubled frequency, a resistance matrix, an indicating switch connected between said low pass filter and the connection point of two series resistors in said matrix, two parallel detectors of different polarity connected between the connection point of the output side of the sideband filter and the synchronous doubling circuit and two parallel resistors, respectively, of the matrix, and two further switches connected between said matrix and two output terminals, respectively, each of said two switches having two contacts, three of said contacts being connected to one line of the marix and the remaining contact being connected to the other line of the matrix, said further switches being coupled with said indicating switch and to each other so that in one position said indicating switch is open and both further switches are connected to said one line of said matrix and in the other position said indicating switch is closed and one of said further switches is connected to one matrix line and the second further switch is connected to the other matrix line.

References Cited by the Examiner

UNITED STATES PATENTS 3,122,610 2/1964 Csicsatka ............ 179—15

OTHER REFERENCES

Radio-Electronics, "Search Control for FM Stereo," August 1962, p. 99. Call No. TK 6540.R24.

DAVID G. REDINBAUGH, *Primary Examiner.*

R. L. GRIFFIN, *Assistant Examiner.*